United States Patent Office 3,419,619
Patented Dec. 31, 1968

3,419,619
PROCESS FOR PREPARING PURE
DIMETHYLSULFOXIDE
Alfons Söder and Wolfgang Hempel, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 16, 1965, Ser. No. 440,319
Claims priority, application Germany, Mar. 26, 1964, F 42,439
2 Claims. (Cl. 260—607)

ABSTRACT OF THE DISCLOSURE

Industrial dimethyl sulfoxide is purified to a high degree of purity with aluminum oxide having an activity level (step) of I, available surface area from 50 to 300 sq. m./g., and a pH value above 6.5. The purification is conveniently carried out in a column or tube filled with the specified type of aluminum oxide.

Recently, dimethyl-sulfoxide has gained special importance likewise for pharmaceutical use. When applying it in the pharmaceutical field, the requirements as regards purity are very high in order to exclude undesired side effects caused by contaminations. Since industrial dimethylsulfoxide does not meet these requirements as regards purity, an uncomplicated and economical method of purification showing a high degree of efficiency likewise when applied on an industrial scale, was to be found. The purifying methods hitherto known are not free from drawbacks. For instance, in the course of the distillation the tendency of decomposing shown by the sulfoxide when thermally charged, is unfavorably influenced. Only a part of the contaminations can be removed by crystallization which even causes considerable losses of substance.

Now we have found that pure dimethyl-sulfoxide is obtained by treating dimethyl-sulfoxide prepared according to known processes, with neutral or basic aluminumoxide. When operating in this way, it is surprisingly possible to remove in one operation the considerably different contaminations such, for instance, as discolorations, iron complexes, sulfur-containing odorous substances and water residues.

The amount of aluminium-oxide required for the purification is adapted to the degree of contamination of the industrial crude product. The effect can be controlled by known gas-chromatographic methods.

Aluminium-oxide with an accessible surface between about 50 and 300 sq. m./gram and an activity step I, defined according to H. Brockmann and H. Schodder, Chem. Ber. 74, 73 (1941) and adjusted to a pH-value superior to 6.5 is particularly suitable for the process of the present invention.

The purification can be carried out favorably, for instance, in a vertical tube as it is used for chromatographic separations, but the invention is not limited to this particular form.

Since the dimethyl-sulfoxide adhering to the aluminium oxide can be recovered and added to following batches, the yield of pure dimethyl-sulfoxide attains nearly quantitative values.

The very simple and economical process can be carried out likewise on an industrial scale with utmost protection of the product, a high degree of efficiency and only a small expenditure of apparatus. For instance, the disadvantageous thermal charge of the product can be excluded expecially with larger batches. Such a thermal charge cannot be avoided in the case of distillations requiring many apparatuses and working with exclusion of air (H. L. Schläfer, W. Schaffernicht, Agnew. Chem. 72, 625 (1960).

The pure dimethyl-sulfoxide obtained according to the new process meets the high requirements when applied in the pharmaceutical field. Moreover, the dimethyl-sulfoxide obtained, due to its purity, is particularly suitable for dissolving gases such as acetylene, ammonia, sulfur dioxide and nitrogen dioxide, since undesired reactions of the dissolved gases with impurities cannot occur.

The following example serves to illustrate the invention but it is not intended to limit it thereto:

Example 350 grams of basic aluminium oxide (surface about 155 sq. m./gram, pH-value adjusted to 9.5) of the activity step I are introduced into a vertically placed tube of a diameter of 45 mm. and a length of 1250 mm. whose lower side is sealed by a glass frit. 5000 milliliters of brown decolorized industrial dimethyl-sulfoxide of intense smell are sent through this tube. At the lower end nearly the same quantity of a water-clear product is obtained which shows only the weak specific odor of pure dimethylsulfoxide.

Melting point 18.4–18.5° C.

Gas-chromatographic purity test: Sum of all contaminations <0.1%.

The dimethyl-sulfoxide thus obtained can be used for pharmaceutical purposes.

We claim:
1. A process for preparing purified dimethyl sulfoxide consisting essentially of contacting in a vertical zone impure dimethyl sulfoxide with aluminum oxide, said aluminum oxide having an activity level of I, a surface area from 50 to 300 sq. m./g., and a pH value above 6.5.
2. The process according to claim 1 wherein the aluminum oxide has a surface area from 50 to 300 sq. m./g., and a pH value of 9.5.

References Cited

Kolthoff et al., Electrochemical Society, vol. 10, pp. 980–981 (1961).

CHARLES B. PARKER, *Primary Examiner.*

D. R. PHILLIPS, *Assistant Examiner.*